Figure 1:
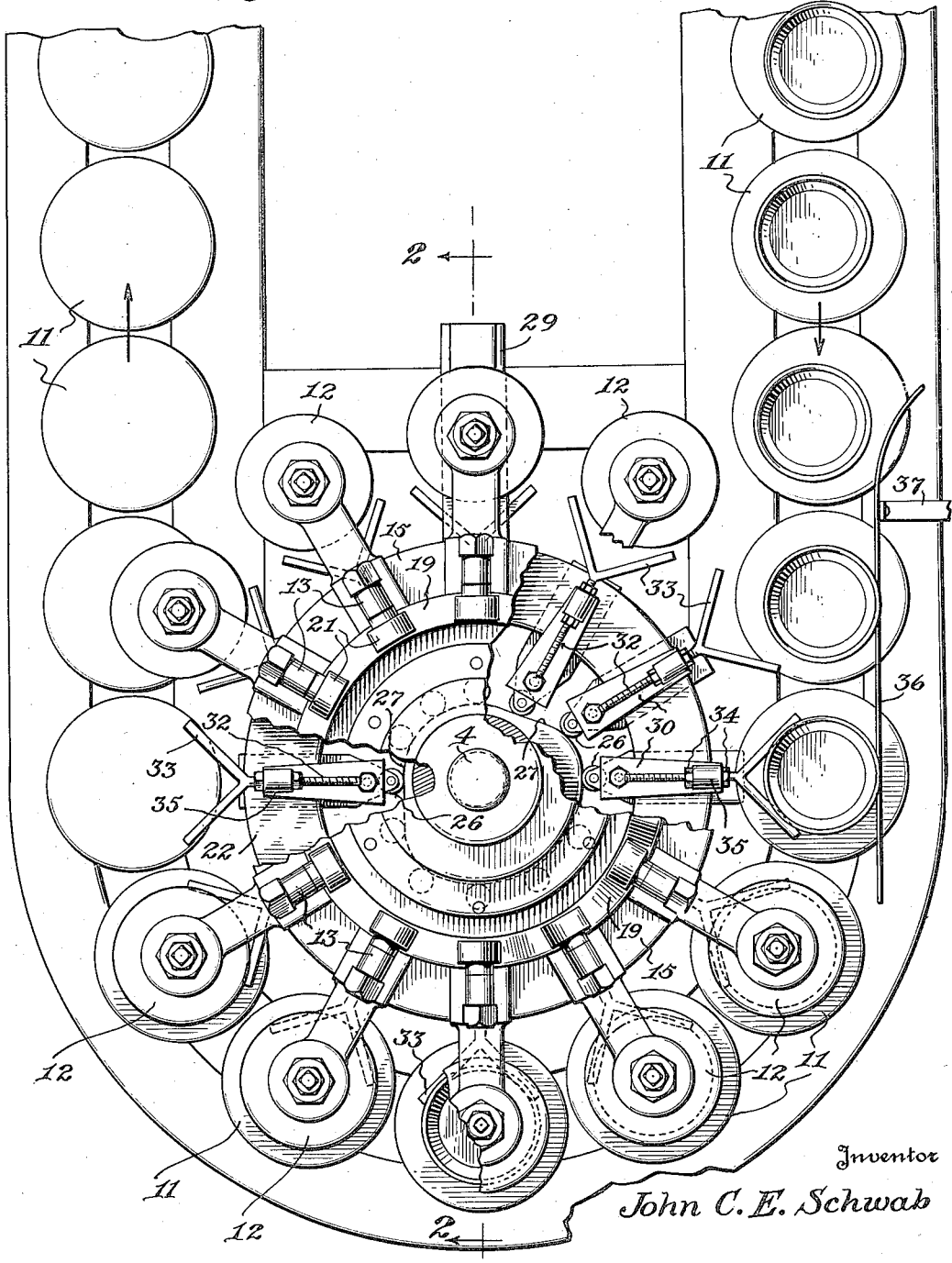

Nov. 5, 1935.  J. C. E. SCHWAB  2,019,736
FITTER OR SHAPER FOR GLASS ARTICLES
Filed May 9, 1933  2 Sheets-Sheet 1

Inventor
John C. E. Schwab
By
Eccleston & Eccleston
Attorneys

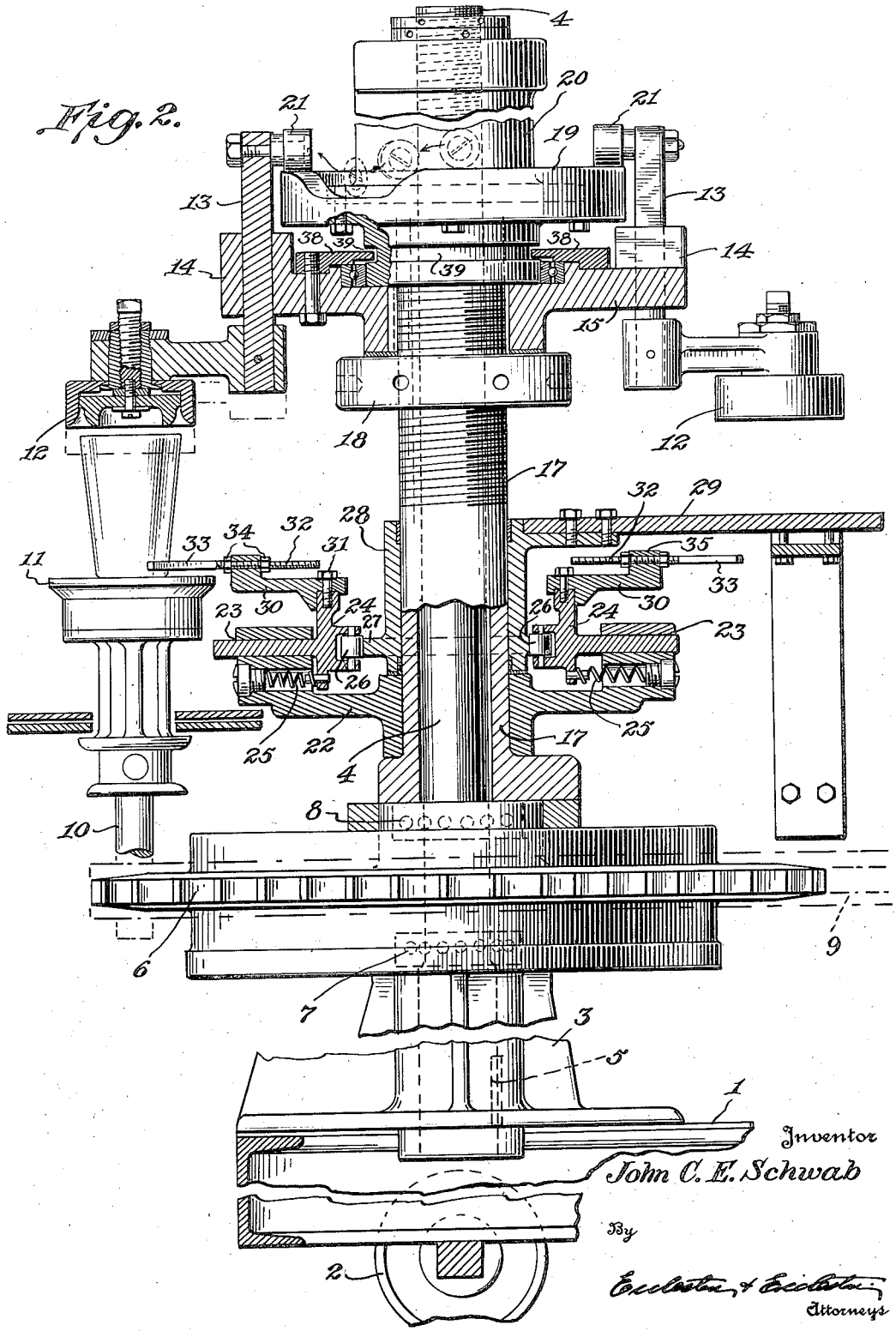

Patented Nov. 5, 1935

2,019,736

UNITED STATES PATENT OFFICE 2,019,736

FITTER OR SHAPER FOR GLASS ARTICLES

John C. E. Schwab, Clarksburg, W. Va., assignor to Hazel-Atlas Glass Company, Wheeling, W. Va., a corporation of West Virginia Application May 9, 1933, Serial No. 670,191

7 Claims. (Cl. 49—22)

The invention relates particularly to fitters or shapers employed in the truing or shaping of various glass articles, such as tumblers. The present invention is particularly adapted to be associated with a fire-finisher or glazer. The glass articles as formed on the press or other forming machine are placed on the conveyer of the glazer either mechanically or by hand, and as thus delivered to the conveyer they are not accurately positioned. Even if the articles were accurately positioned when delivered to the conveyer they might be moved slightly out of true position during their passage through the glazer. It is essential, of course, that each article assume an exact predetermined position at the instant the fitter operates, and the primary object of the present invention is to provide a simple and dependable construction which operates continuously to accurately center or position each article as it approaches the point where the fitter comes into play.

Other objects and advantages of the invention will be apparent to those skilled in the art from the following detailed description when taken in connection with the accompanying drawings; in which, Figure 1 is a plan view of the apparatus, shown in combination with the rear portion of a glazer conveyer which carries the ware from the forming machine through the glazer to the fitter. Parts of the apparatus are broken away and parts are omitted to more clearly show the construction.

Figure 2 is a vertical sectional view taken on the line 2—2 of Figure 1, parts being omitted for the sake of clearness.

Referring to the drawings in more detail, the numeral 1 indicates a base or carriage provided with wheels 2, and on which is mounted the fire-finisher or glazer with which the present invention is associated.

Mounted on the base 1 is an upright sleeve or pedestal 3 in which is positioned a post or axle 4 fixed to the pedestal against rotation by a key 5. A sprocket wheel 6 is mounted on the post 4 and is rotatably supported on ball bearings 7 and 8. This wheel meshes with a sprocket chain 9 shown in dotted outline and which is similarly engaged by a driving sprocket wheel at the other end of the apparatus.

The chain 9 propels a plurality of spindles 10 through a closed circuit, from the forming machine through the glazer and back to the forming machine. Each of the spindles is provided with a ware-supporting disc 11 at its upper end, and needless to say the spindles and their discs are rotated in the usual manner while the glass articles supported thereby are being fire-polished. As the ware-supporting discs approach the rear end of the closed path of travel they bring the glass articles into register with the centering device and fitters, as will now be described.

The fitter heads are referred to by numeral 12, and by reference to the drawings it will be noted that in this particular instance twelve of these fitter heads are provided; although the number may be varied in different installations. The fitter heads per se are of any desired construction and are such that when lowered into engagement with the mouth of a tumbler or similar article, the mouth of the article will be at once brought to the required shape.

Each fitter is carried by a rod 13 which is slidably mounted in a sleeve bearing 14 formed in the peripheral portion of a disc 15. This disc is keyed to a hollow shaft 17 which is continuously rotated by the sprocket wheel 6. Hence the fitters are travelling at the same speed as the ware-supporting discs. And the paths of travel of the fitters and the ware-supporting discs are the same during at least that portion of travel where the fitters are functioning. The fitters and associated parts may be vertically adjusted by any preferred means, as by a ring 18 mounted on threads provided on the exterior of the hollow shaft.

The raising and lowering of the fitters 12 is controlled by a cam 19. This cam is, of course, stationary; and in the particular form illustrated it is maintained in its fixed but adjustable position by being bolted or otherwise secured to a sleeve 20 which is secured to the upper end of the stationary post 4. The upper ends of the rods 13 carry rollers 21 which ride on the surface of the cam 19. This cam has high and low portions, and the contour is such that as each fitter aligns vertically with a tumbler the fitter moves downwardly by gravity to engage the mouth of the tumbler; the cam having a low portion at this point. The fitter and tumbler now travel together for the desired distance, and at the proper instant, preferably just before the tumbler or other article reaches the point of discharge, the roller rides up on the high portion of the cam, thereby lifting the fitter from engagement with the article.

For the apparatus to operate efficiently it is necessary that the articles to be fitted or shaped be very accurately centered at the instant the fitters are lowered. The device for centering the articles will now be described.

The revolving shaft 17 has fixed thereto a revolving frame 22 provided with radially arranged sleeve bearings 23, corresponding in number and position with the fitters 12. Slidably mounted in each of these bearings is a member 24, and these members are urged inwardly by springs 25. The inner ends of the members are provided with rollers 26 which travel about a stationary cam 27 carried by a sleeve 28 loosely mounted on the shaft 17 and held against rotation by any desired means, as by an arm 29 having its inner end fixed to the sleeve and its outer end fixed to the frame of the machine. The contour of the cam 27 is such that the members 24 will be gradually moved outwardly, against the pressure of the springs 25, as they reach the point where the fitters are about to be lowered; and when the fitting or shaping operation is completed the cam permits the members to be moved inwardly by the springs 25.

Each member 24 carries an outwardly extending arm 30 attached thereto by any desired means, as by bolts 31. Mounted on each arm is a rod 32, and the outer ends of these rods carry V-shaped centering elements 33. These rods are adjustable inwardly or outwardly by means of nuts 34 threaded on the rod at opposite ends of the lugs 35 through which the rods pass. In addition to the centering mechanism described above there is also provided a leaf spring 36 which has one end free and the other end fixed to a bracket 37. It will be apparent that if any articles are positioned so far outwardly on the ware-carrying discs 11 that they would not be positioned by the centering mechanism, this resilient member will gently move the articles inwardly until they are brought under the control of the centering mechanism.

For the purpose of assisting in the removal of all of the fitter parts as a unit, I preferably provide an annular plate 38 bolted to the disc 15 and having its inner portion projecting into a channel 39 provided in the sleeve of cam 19.

In the operation of the mechanism, the glass articles are removed from the molds of the forming machine and individually placed upon the discs 11, either mechanically or manually. After being operated upon by the fire polisher the ware approaches the end of the apparatus on which the fitters or shapers 12 are mounted. As will be obvious, the fitters are brought over the discs serially as the discs approach the rear end of the machine. But before the fitters are lowered into engagement with the ware it is necessary to accurately center the ware with respect to the fitters. Any articles which happen to be on the outer portion of the discs will be moved inwardly by the leaf spring 36, and thus all of the articles will be so positioned on the discs that they will ride between the prongs of the centering members 33, and just before the point is reached where the fitters are lowered, the cam 27 moves the centering member outwardly to a point where the article is exactly centered with respect to the fitter. It will be understood, of course, that in handling ware of different diameters the centering members are adjusted inwardly or outwardly by the nuts 34. The article having been accurately centered, the parts are now in a position where the particular fitter reaches the lower portion of the cam 19, whereby the fitter drops by gravity into engagement with the mouth of the tumbler or similar article. The parts now travel together a short distance, and just before the article reaches the point of discharge the cam lifts the fitter free from the article. As the parts continue their movements the cam 27 permits the springs 25 to move the centering members inwardly, where they remain until the continued operation of the machine again brings them into play to center the succeeding articles.

In accordance with the patent statutes I have described what I now believe to be the preferred embodiment of the invention, but obviously many changes and modifications may be made without departing from the spirit of the invention, and all such changes and modifications are intended to be included within the scope of the appended claims.

What I claim is:

1. A fitter for glassware, including a series of fitter heads, a central shaft about which the fitter heads continuously revolve, a continuously moving conveyer traveling about said shaft as an axis, and bringing formed glass tumblers or the like successively into position below the respective fitter heads, means for successively lowering the fitter heads into engagement with only the upper end portions of the formed glass articles, the fitter heads and glass articles travelling together momentarily, means for successively lifting the fitter heads from the articles, and means for vertically adjusting all of the fitter heads simultaneously.

2. A fitter for glassware including a series of fitter heads, a central shaft about which the fitter heads revolve, a conveyor bringing glass articles successively into position below the respective fitter heads, a centering member below each fitter head, and means for successively moving the centering members radially to center the glass articles with respect to the fitter heads.

3. A fitter for glassware including a series of fitter heads, a central shaft about which the fitter heads revolve, a conveyer bringing glass articles successively into position below the respective fitter heads, a centering member below each fitter head, and means for successively moving the centering members outwardly to center the glass articles with respect to the fitter heads.

4. A fitter for glass articles including a series of fitter heads, a central shaft about which the fitter heads revolve, a conveyer bringing glass articles successively into position below the respective fitter heads, a centering member for each fitter head, and means for successively moving the centering members outwardly across the conveyer to center the articles with respect to the fitter heads.

5. A fitter for glass articles including a series of fitter heads, a central shaft about which the fitter heads revolve, a conveyer bringing glass articles successively into position below the fitter heads, a centering member having a forked end associated with each fitter, and means for successively moving the centering members outwardly to engage and center the articles with respect to the fitter heads.

6. A fitter for glass articles including a series of fitter heads, a central shaft about which the fitter heads revolve, a conveyer bringing articles successively into position below the fitter heads, a centering member having a forked end associated with each fitter, means for successively moving the centering members outwardly to engage and center the articles with respect to the fitter heads, and means for adjusting the outward limit of movement of the centering members.

7. A fitter for glass articles including a series of fitter heads, a central shaft about which the fitter heads revolve, a conveyer bringing articles successively into position below the fitter heads, a centering member having a forked end associated with each fitter, means for moving the articles into the forked ends of the centering members, and means for successively moving the centering members outwardly to center the articles with respect to the fitter heads.

JOHN C. E. SCHWAB.